(No Model.) 3 Sheets—Sheet 3.
J. T. KILHAM.
THEATRICAL APPLIANCE.
No. 383,361. Patented May 22, 1888.
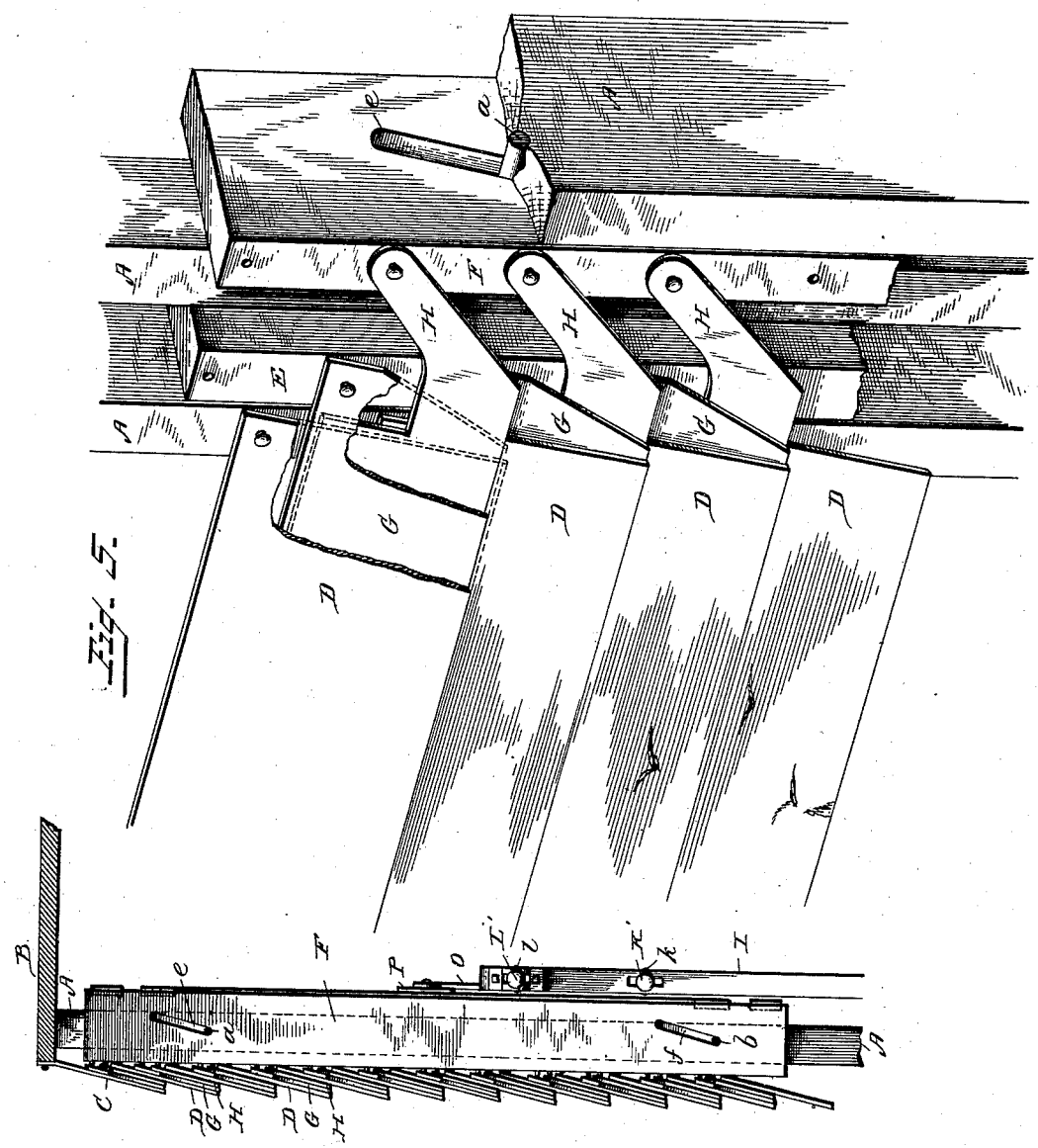

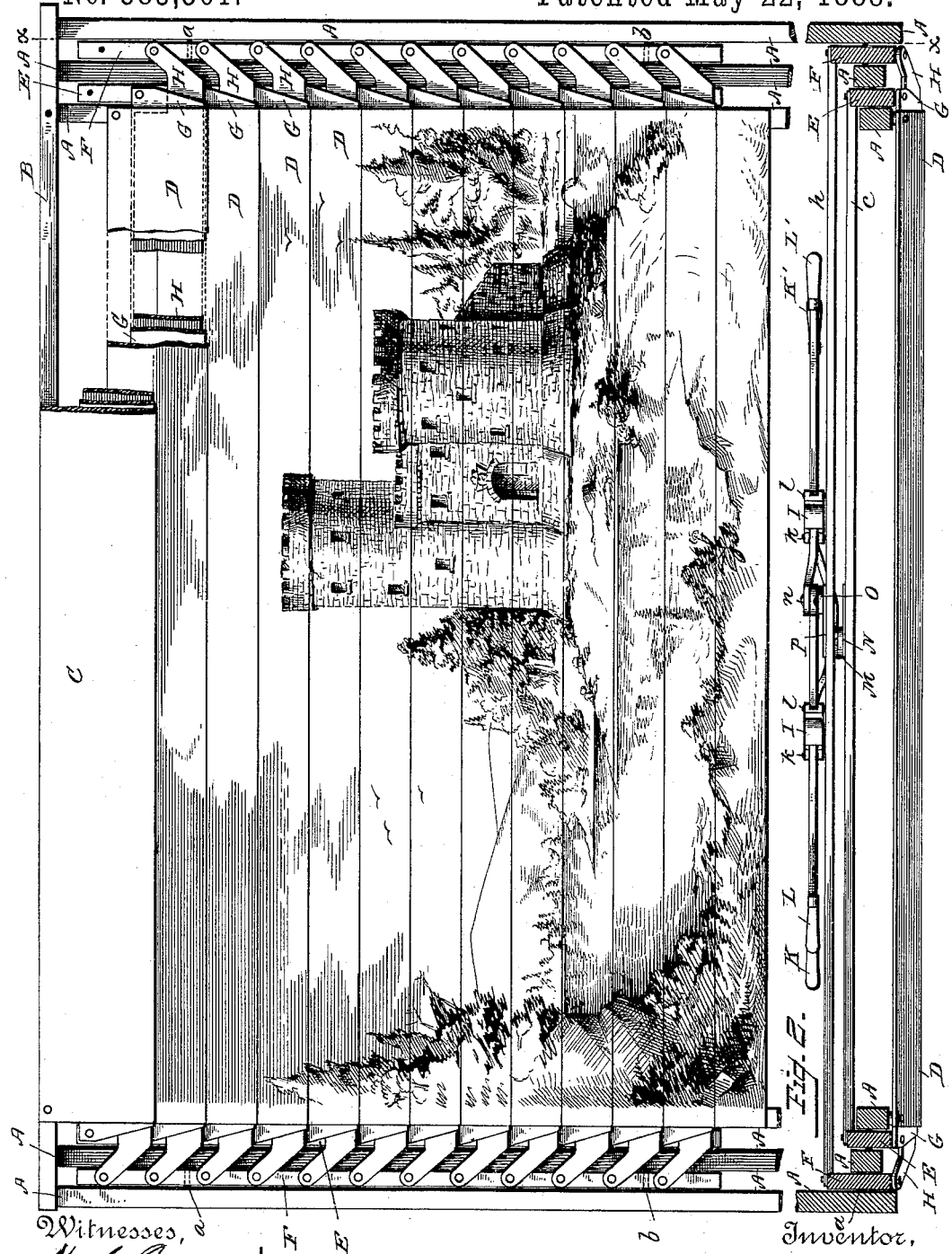

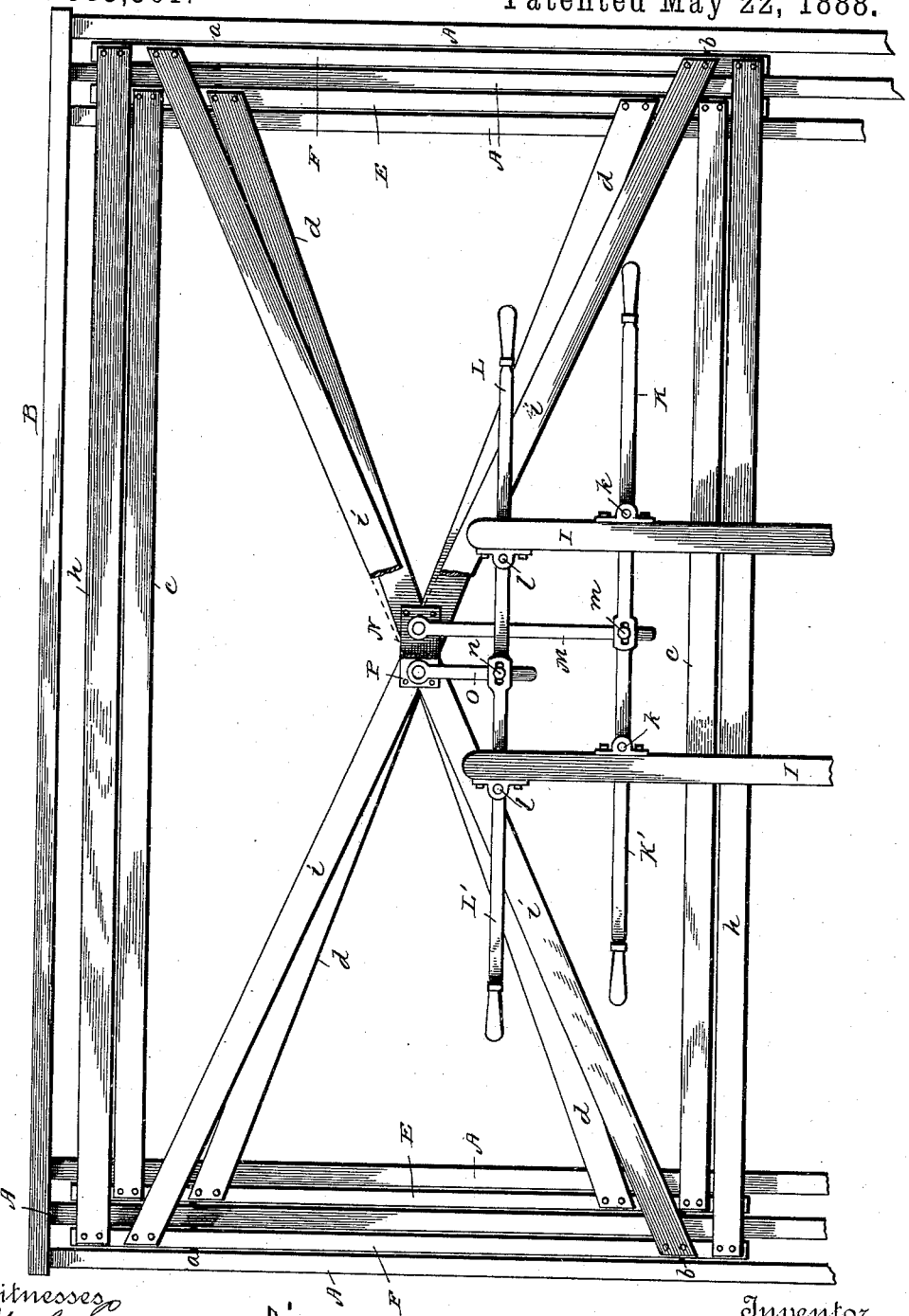

UNITED STATES PATENT OFFICE.

JOHN T. KILHAM, OF WILMINGTON, NORTH CAROLINA.

THEATRICAL APPLIANCE.

SPECIFICATION forming part of Letters Patent No. 383,361, dated May 22, 1888.

Application filed August 8, 1887. Serial No. 246,416. (No model.)

*To all whom it may concern:*

Be it known that I, JOHN T. KILHAM, a citizen of the United States, residing at Wilmington, in the county of New Hanover and State of North Carolina, have invented certain new and useful Improvements in Theatrical Appliances; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to theatrical appliances, and it has particular reference to movable scenery for use upon the stages of theaters.

The object of the invention is to provide a series of scenes which shall be so adjusted and arranged as to permit any one of the several scenes constituting the series to be instantaneously exposed to view without necessitating the turning down of lights or the lowering of the drop-curtain, which expedients it has heretofore often been necessary to resort to in making changes in scenery.

To this end and to such others as the invention may relate the same consists in the peculiar combination, arrangement, and adaptation of parts, all as more fully hereinafter described, shown in the drawings, and then specifically defined in the claims.

In the accompanying drawings, Figure 1 is a front elevation of my improved device for shifting scenery, with parts broken away to better illustrate the invention. Fig. 2 is a plan view of the same, shown partly in section. Fig. 3 is a rear view of the frame-work with the slats removed, showing the shifting mechanism. Fig. 4 is a transverse section on line *x x* of Figs. 1 and 2. Fig. 5 is a detail perspective view on an enlarged scale.

While I have shown my improvement as applied to scenes of a theater, I wish to have it distinctly understood that I do not intend to restrict myself to such use, as it is evident that the same principle may be applied in various other connections where it may be desirable to instantaneously change the scenic effects. Neither do I intend to restrict myself to the particular means I have shown for accomplishing the result attained, for various other forms of mechanism may be employed without departing from or materially affecting the essence of my invention. The drawings illustrate the preferred form.

Referring now to the details of the drawings, A designates suitable uprights connected at the top by a suitable cross-timber, B. The lower ends of these uprights may rest upon or be secured to the stage in any suitable way; or it may be sometimes found desirable, especially when used in theaters having a double stage, to so arrange them that they can be raised or lowered with the stage, and I sometimes design to so arrange them that by means of suitable hoisting devices (not shown) the same may be raised or lowered into a suitable pit. (Not shown.) It is, however, not thought necessary to show these constructions; but they are simply referred to to demonstrate the fact that the invention may be applied in more than the way shown. At the top of these uprights, preferably to the cross-bar B, is secured a stationary slat, C, which may be of any suitable material, preferably thin sheet metal.

D D are similar slats, fixedly secured to the inner uprights, A, as shown. These slats are arranged with a space between them to provide for the movable slats, soon to be described. The stationary slats are slightly inclined outwardly from top to bottom and form a continuous curtain, upon which may be painted or otherwise affixed any appropriate scene.

E F are uprights moving between and guided by the uprights A. To the uprights E are secured, by means of pins, a series of slats, G, and H H are similar slats secured at their ends to the uprights F. The slats are each provided at their upper edges, at points adjacent to their ends, with notches, as shown, which construction serves to prevent the possibility of the slats from catching or otherwise interfering in moving the scenes.

The slats G are arranged at the same incline as the slats D, and one set of slats is arranged to move back of and the other in front of said slats D. When moved by a mechanism which will hereinafter be described, either set of slats G or H will move in front of and completely cover the slats D.

A proper scene may be painted on or otherwise affixed to the slats G, so that when they are thrown forward and cover the slats D an entirely different scene will be presented, and so also with the slats H.

The uprights E F, near their upper and lower ends, are provided with inclined slots *e f*, which are arranged at the same inclination as that of the slats, and in these slots work the guide-pins *a b*, secured to the uprights A. The slats D G H are all removably secured to their supports, so that they may be readily removed and others substituted therefor when desired—for instance, when a change of plays is made, rendering the use of new scenes either necessary or desirable.

All of the slats G are moved together. So are the slats H. In the drawings I have shown one means of accomplishing this, which will be clearly understood by reference to Fig. 3, in which the uprights E E are connected by suitable cross-pieces, *c*, and diagonal cross pieces *d*, and the uprights F by cross-pieces *h* and diagonal cross pieces *i*.

I I are suitable standards or uprights, to which are pivoted the levers K L at *k l*, respectively. The lever K is slotted at its inner end, in which slot works a pin, *m*, carried by the link M, which is attached at its upper end to the plate N, secured to the diagonal pieces *d*, as shown. The lever L is likewise slotted, and engages the pin *n*, carried by the link O, attached at its other end to the plate P, secured to the diagonal cross pieces *i*.

By operating the lever K the slats G are thrown into or out of view simultaneously, as may be desired, and a similar movement is given to the slats H by the lever L. In order that these slats may be moved from either side of the stage, I sometimes provide the levers K' L', suitably pivoted and connected with the links M O, as shown; but one set of levers will ordinarily be found to be sufficient.

I contemplate and desire to cover in the following claims the arranging of the slats vertically and their movement horizontally, which may be accomplished by a simple change in the arrangement of parts, but still embodying the principles of my invention. An idea of how this may be accomplished may be had by assuming the parts in Fig. 3 to be arranged at right angles to the position there shown, or, better still, by turning Fig. 3 so that the parts now shown as vertical will assume a horizontal position.

It will be readily perceived that the parts are detachably connected together, so that they may be readily taken apart and packed within small compass for the purpose of transportation.

I also contemplate using both sides of the slats—that is, scenes may be painted upon both sides, so that with one set of slats, by the mere reversal of the same, I get two different scenes.

Having thus described my invention and set forth its merits, what I claim to be new, and desire to secure by Letters Patent, is—

1. A scene composed of sets of interchangeable sections, the sections of one set constructed to alternately hide and expose those of the other set, substantially as described.

2. Two sectional curtains, the sections of one curtain constructed and arranged to be either exposed over or concealed beneath the other, as set forth.

3. The combination, with a stationary sectional curtain, of a movable sectional curtain, the sections of which move between the sections of the stationary curtain.

4. The combination, with a stationary sectional curtain, of two or more movable curtains, the sections of which move between the sections of the stationary curtain, as set forth.

5. The combination, with a stationary sectional curtain, of two or more movable sectional curtains and means for simultaneously moving all of the sections of one curtain independent of those of the other curtain, substantially as described.

6. A curtain composed of separate sections each carrying a portion of a scene and arranged when overlapped to form a complete scene, substantially as described.

7. A curtain composed of separate removable sections each carrying a portion of a scene and arranged when overlapped to form a complete scene, substantially as described.

8. The combination, with the stationary uprights provided with transverse pins, of the movable uprights having inclined slots engaging said pins, and the slats carried by said movable uprights, substantially as and for the purpose described.

In testimony whereof I affix my signature in presence of two witnesses.

JOHN T. KILHAM.

Witnesses:
  WM. D. SIPPELL,
  CHARLES S. MERENESS.